US010203198B2

(12) United States Patent
Walecki

(10) Patent No.: US 10,203,198 B2
(45) Date of Patent: Feb. 12, 2019

(54) MEASUREMENT OF SURFACE TOPOGRAPHY OF A WORK-PIECE

(71) Applicant: APPLEJACK 199 L.P., San Jose, CA (US)

(72) Inventor: Wojciech J. Walecki, Sunrise, FL (US)

(73) Assignee: APPLEJACK 199 L.P., Milpitas, CA (US)

( * ) Notice: Subject to any disclaimer, the term of this patent is extended or adjusted under 35 U.S.C. 154(b) by 0 days.

(21) Appl. No.: 15/794,707

(22) Filed: Oct. 26, 2017

(65) Prior Publication Data

US 2018/0335295 A1 Nov. 22, 2018

Related U.S. Application Data

(60) Provisional application No. 62/509,331, filed on May 22, 2017.

(51) Int. Cl.
*G01B 11/16* (2006.01)
*G01B 11/24* (2006.01)

(52) U.S. Cl.
CPC .............. *G01B 11/16* (2013.01); *G01B 11/24* (2013.01)

(58) Field of Classification Search
CPC . G01B 11/0616; G01B 11/306; G01B 11/303; G01B 11/0641; G01B 17/08; G01B 11/065; G01B 11/24; G01B 11/2441; G01B 11/0625; G01B 11/0633; G01B 11/16; G01B 21/042; G01B 21/30; G01B 2210/56; G01B 9/02; G01B 9/02007; G01B 9/02015; G01B 9/02021; G01B 9/02032; G01B 9/02082; G01B 9/02084; G01B 11/06; G01B 11/254; G01B 11/30; G01B 2290/45; G01B 2290/70; G01B 9/02081; G01N 21/9501; G01N 21/21; G01N 21/47; G01N 21/211; G01N 27/44791; G01N 33/48721; G01N 2021/4792; G01N 2021/8427; G01N 2021/8841; G01N 21/65; G01N 21/9506; G01N 21/958; G01N 2201/103; G01N 2201/104; G01N 2201/1045; G01N 2203/0078; G01N 2291/0256; G01N 2291/106; G01N 3/317;
(Continued)

(56) References Cited

U.S. PATENT DOCUMENTS

| 7,084,979 | B1 * | 8/2006 | Aiyer | G01B 11/0608 356/369 |
| 2001/0013936 | A1 * | 8/2001 | Nielsen | G01N 21/9501 356/601 |
| 2004/0252393 | A1 * | 12/2004 | Wang | G11B 5/58 360/25 |

* cited by examiner

*Primary Examiner* — Michael P Stafira
(74) *Attorney, Agent, or Firm* — Maschoff Brennan

(57) ABSTRACT

An apparatus and a method for measuring surface topography of a work-piece are described. The apparatus comprises a light emitting assembly configured to emit an emitted beam of light, the emitted beam being emitted at a plurality of wavelengths and modulated at modulating frequency, the emitted beam being directed onto a surface of a work-piece. A detector is configured to receive a reflected beam of light that includes at least a portion of the emitted beam as reflected from the surface of the work-piece. The detector is further configured to generate a signal indicative of a position of the reflected beam on the detector. A signal processing unit is configured to remove noise from the signal thus generated based on the modulating frequency to obtain a processed signal. A control unit is configured to determine topography of the surface based on the processed signal.

25 Claims, 13 Drawing Sheets

(58) Field of Classification Search
CPC ......... G01N 21/9505; G01N 21/95607; G01N 29/0663; G01N 29/2418; G01N 29/2437; G01J 1/42; G01J 9/00; G02B 1/14; G02B 3/005; G02B 3/0062; G02B 5/0221; G02B 5/0242; G02B 5/0268; G02B 5/0278; G02B 5/0284; G02B 5/04; G02B 6/0051; G02B 6/0053; G02B 6/0061; G02B 6/0076; G02B 7/32
See application file for complete search history.

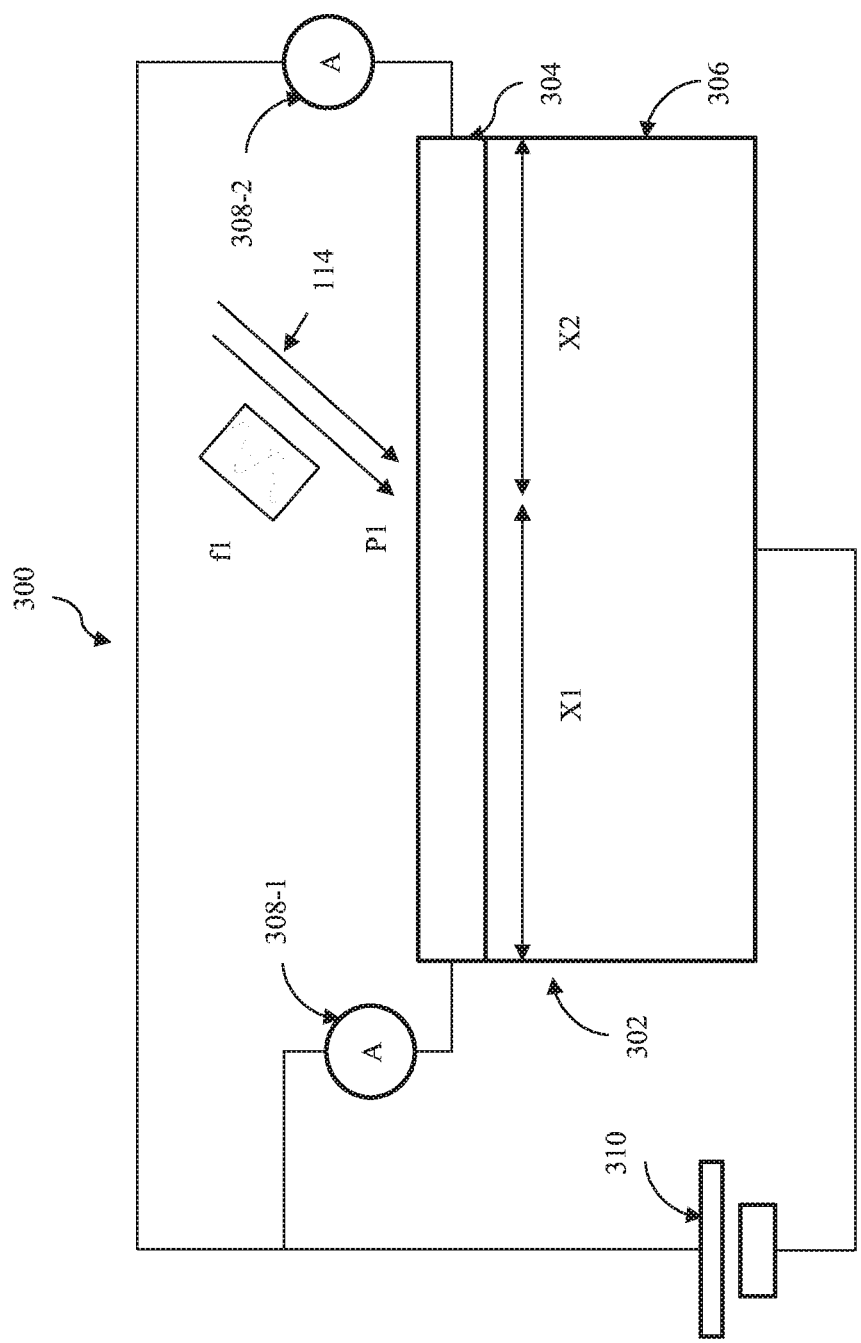

MEASUREMENT OF SURFACE TOPOGRAPHY OF A WORK-PIECE

CROSS REFERENCE TO RELATED APPLICATION

This application claims the benefit of U.S. Provisional Application No. 62/509,331, filed May 22, 2017, and incorporated herein by reference in its entirety.

TECHNICAL FIELD

The present disclosure generally relates to measuring surface topographies and more particularly measuring surface topographies in thin films substrates.

BACKGROUND

Integrated circuits are formed on semiconductor wafer substrates by a number of processing steps. These steps include deposition, etching, implantation, doping, and other semiconductor processing steps well known to those skilled in the art. Thin films are typically formed on the surface of the semiconductor wafer substrates (hereinafter referred to as wafer substrates) by a deposition process. The thickness of such films may range from about a few hundred angstroms to several micrometers. Often, three or more film layers are formed on the surface of a single wafer substrate.

In fabricating wafer substrates, it may be desirable to minimize or control stresses in surface films. High surface stresses can cause, for example, silicide lifting, the formation of voids or crack and other conditions that adversely affect semiconductor devices (i.e., chips) which are fabricated on the wafer substrates. In practice, surface stresses become more problematical as the level of circuit integration increases and are especially troublesome when fabricating large scale integration (LSI), very large scale integration (VLSI), and ultra large scale integration (ULSI) semiconductor devices.

The stress in the surface film of the wafer substrate can be either compressive or tensile. Assuming the film is on top of the wafer substrate, a compressive stress in a surface film may cause the wafer substrate to slightly bow in a concave direction, while a tensile stress in a surface film may cause the wafer substrate to slightly bow in a convex direction. Therefore, both compressive and tensile stresses cause the surface of the wafer substrate to deviate from exact planarity. The extent of the deviation from planarity can be expressed in terms of the radius of curvature of a surface of the wafer substrate. In general, the greater the magnitude of surface stresses, the smaller the radius of curvature.

Due to the aforementioned problems caused by stresses in surface films on wafer substrates, it may be desirable to measure such stresses. The measurements can be used, for example, to identify wafer substrates that are likely to provide low yields of semiconductor devices or which might produce devices prone to early failure. Generally, stresses in surface films are not measured directly but, instead, are inferred from measurements of the radius of curvature of the surface of interest. Various techniques are available that enable measuring of curvature and consequently stress.

SUMMARY

The present disclosure provides an apparatus and method for measuring surface topography on a work-piece and stress thereof.

In one embodiment, the apparatus includes a light emitting assembly configured to emit an emitted beam of light. The emitted beam is emitted at a plurality of wavelengths and is modulated with a modulating frequency. The emitted beam is directed onto a surface of a work-piece. The apparatus includes a detector configured to receive a reflected beam of light that includes at least a portion of the emitted beam as reflected from the surface of the work-piece and generate a signal indicative of a position of the reflected beam on the detector. The apparatus includes a signal processing unit configured to remove noise from the signal thus generated based on the modulating frequency to obtain a processed signal. The apparatus includes a control unit configured to determine the topography of the surface based on the processed signal.

In another embodiment, the apparatus includes a first light emitting assembly configured to emit a first emitted beam of light. The first emitted beam is emitted at a plurality of wavelengths and is modulated at a first modulating frequency. The first emitted beam is directed onto a surface of a work-piece. The apparatus includes a second light emitting assembly configured to emit a second emitted beam of light. The second emitted beam is emitted at a plurality of wavelengths and is modulated at a second modulating frequency. The second modulating frequency is substantially different from the first modulating frequency. The second emitted beam is directed onto the surface of the work-piece. The apparatus includes a detector configured to receive a first reflected beam of light and a second reflected beam of light. The first reflected beam includes at least a portion of the first emitted beam as reflected from the surface of the work-piece and the second reflected beam includes at least a portion of the second emitted beam as reflected from the surface of the work-piece. The detector is further configured to generate a first signal indicative of a position of the first reflected beam on the detector based on the first modulating frequency, and a second signal indicative of a position of the second reflected beam on the detector based on the second modulating frequency. The apparatus includes a control unit configured to determine a topography of the surface based on the first signal and the second signal.

BRIEF DESCRIPTION OF THE DRAWINGS

The present subject matter is illustrated by way of example, and not by way of limitation, in the figures of the accompanying drawings in which:

FIG. 3a and FIG. 3b schematically illustrates a detector employed in the apparatus shown in FIG. 1, in accordance with an embodiment of the present subject matter.

DETAILED DESCRIPTION OF SOME EXAMPLE EMBODIMENTS

Figure 1:
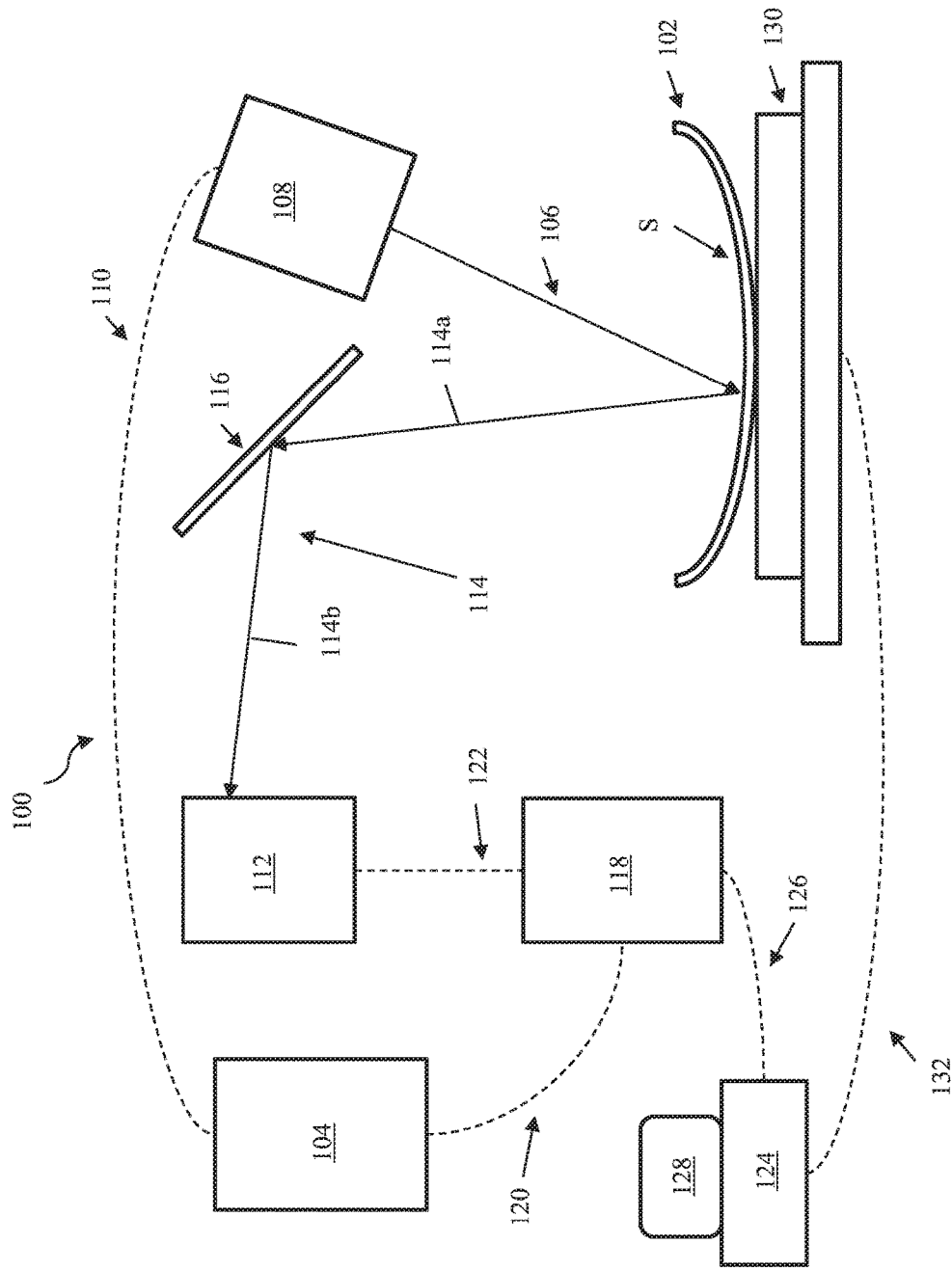
FIG. 1 schematically illustrates an apparatus for measuring surface topography of a work-piece, in accordance with an embodiment of the present subject matter.

Due to problems caused by stresses in surface films on wafer substrates, it may be desirable to measure such stresses and resulting curvatures. One common technique for measuring the curvature of a wafer substrate is by reflecting a guided beam of radiant energy, such as one generated by a laser, from a surface film of the wafer substrate. A detector detects a portion of the reflected beam; as the wafer or laser is moved, the deviation of the beam from a point at the detector is recorded and analyzed to detect the curvature of the surface. However, the amplitude of the reflected beam can be reduced due to destructive interference. The destructive interference is caused by reflection from the surface film on the wafer substrate, which includes an upper surface boundary and a lower surface boundary. A beam of light is partially reflected and partially transmitted through the upper film boundary. The transmitted portion of the beam is reflected by the lower film boundary and interferes with the first reflected portion of the beam due to well-known optical interference principles. The thickness of the surface film can cause the second reflected portion of the beam to be out-of-phase with the first reflected portion, resulting in the destructive interference. Destructive interference may weaken or almost completely cancel the amplitude of the reflected beam, thereby causing difficulties in detecting the reflected beam and resulting in errors in the curvature testing process.

In another common technique, a dual frequency laser apparatus measures stress in a thin film. A laser beam composed of two different wavelengths is directed onto a surface of a wafer substrate with a thin film and reflected to a detector. If one of the wavelengths permits destructive interference to occur in the reflected beam, the other transmitted wavelength may not, and the reflected beam can be detected. Two separate laser beams, each of a distinct wavelength, are combined into the dual-wavelength beam by a beam splitter to accomplish this goal. However, the reflected beam may be subjected to interference from noise or thermal background light.

The present disclosure includes an apparatus and method that reduce the destructive interference and reduce the inefficiency of using combined, multiple-frequency energy sources to measure thin films. For example, as detailed below, one or more embodiments of the present disclosure may reduce the destructive interference by creating one beam with multiple wavelengths. Further, a better beam quality is generated due to the creation of one beam with multiple wavelengths.

Further, one or more embodiments of the present disclosure may remove noise, e.g., stray or thermal background light, from the generated signal by modulating the emitted beam with a frequency, and therefore may enable determining the topography and the stress thereof accurately. Further, one or more embodiments of the present disclosure may enable measurement of several light beams simultaneously by modulating the emitted beams with substantially different frequencies. In addition, problems associated with light losses on inter-pixel spaces and pixel non-uniformity may be reduced or eliminated. In the present disclosure, a reference to operations occurring "simultaneously" may include operations that occur with a threshold time frame of each other and are not limited to truly exact simultaneously performed operations.

FIG. 1 schematically illustrates an apparatus 100 for measuring surface topography of a work-piece 102, in accordance with an embodiment of the present subject matter. The term 'topography', as used herein, refers to any description of a surface of the work-piece 102, such as curvature, contours, etc. Examples of the work-piece 102 include, but not limited to, semiconductor wafer substrates, hard disk platters, optical blanks, etc. For the sake of clarity, light beams are represented as a solid arrow and physical connections/couplings via coupling mechanisms are represented as dashed lines in the figures.

The apparatus 100 includes a light emitting assembly 104 configured to emit an emitted beam 106 of light. The emitted beam 106 is emitted at a plurality of wavelengths and is modulated with a modulating frequency. The modulating frequency is in range of 100 Hz to 1 MHz. The emitted beam 106 is directed onto a surface S of the work-piece 102. The light emitting assembly 104 is coupled a first beam directing unit 108 via a single mode optical fiber 110. The first beam directing unit 108 is configured to direct the emitted beam 106 being emitted from the light emitting assembly 104 onto the surface S of the work-piece 102. The first beam directing unit 108 may include a lens (not shown in the figure) such as a converging lens, as known in the art, that allows the emitted beam 106 to form a beam spot on the surface S of the work-piece 102.

The apparatus 100 further includes a detector 112 configured to receive a reflected beam 114 of light that includes at least a portion of the emitted beam 106 is reflected from the surface S of the work-piece 102. The apparatus 100 further includes a second beam directing unit 116 configured to direct the reflected beam 114 from the surface S of the work-piece 102 to the detector 112. Examples of the second beam directing unit 116 include, but not limited to, folding mirror and a beam splitter. As would be understood, the beam-splitter allows for the emitted beam 106 to impinge the surface S of the work-piece 102 at a normal or sufficiently normal angle to the plane of the work-piece 102.

Further, as would be understood, the surface S of the work-piece 102 reflects a portion of the emitted beam 106 as a partially reflected beam 114a. The partially reflected beam 114a impinges upon the second beam directing unit 116 and is directed towards the detector 112 as a directed beam 114b. Therefore, the reflected beam 114 comprises the sum of beams 114a and 114b. Upon receiving the reflected beam 114, the detector 112 is further configured to generate a signal indicative of a position of the reflected beam on the detector 112.

Further, the detector 112 is selected from a group comprising of a one-dimensional (1D) position sensitive detector (PSD) and a two-dimensional (2D) PSD. In an implementation, the detector 112 is a 1D PSD and the 1D PSD generates the signal indicative of a position of a beam spot formed by the reflected beam 114 impinging on the 1D PSD in 1D. In another implementation, the detector 112 is a 2D PSD and the 2D PSD generates the signal indicative of a position of a beam spot formed by the reflected beam 114 impinging on the 2D PSD in 2D. A working of the 1D PSD for measuring the position of the beam spot in accordance with the present disclosure is explained in later paragraphs. As would be understood, the PSD is a single pixel device. Therefore, in such implementations, problems associated with light losses on inter-pixel spaces and pixel non-uniformity may be reduced eliminated. In addition, the PSD can be significantly faster and may require less digital processing, thereby resulting in improved performance of the apparatus 100.

The apparatus 100 is further a signal processing unit 118. The signal processing unit 118 is configured to remove the noise from the signal generated by the detector 112 based on the modulating frequency to obtain a processed signal. The noise can be stray light or thermal background light. Typically, the signal processing unit 118 rejects white noise or a thermal background having an amplitude larger (e.g., approx. 100000×) than an input signal. Therefore, a reference frequency of the signal processing unit 118 is synchronized with the modulating frequency using for modulating the emitted beam 106. This enables separation of the signal generated by the detector 112 that has known frequency and phases from other sources of radiation, which are not synchronized such as the thermal background.

Further, the signal processing unit 118 is coupled to the light emitting assembly 104 via a coupling mechanism 120 such as a cable. As such, the signal processing unit 118 is tuned or synchronized with the modulating frequency used for modulating the emitted beam 106. The signal processing unit 118 is further coupled to the detector 112 via a coupling mechanism 122 such as cable. The signal processing unit 118 is selected from a group comprising of a phase sensitive detector, a low-noise amplifier, analog lock-in amplifier and a digital lock-in amplifier. A working of the lock-in amplifier in the signal processing unit 118 for removing noise from the signal in accordance with the present disclosure is explained in later paragraphs.

The apparatus further includes a control unit 124 coupled with the signal processing unit 118 via a coupling mechanism 126 such as a cable. The control unit 124 is configured to receive the processed signal from the signal processing unit 118. The control unit 124 is configured to determine the topography of the surface based on the processed signal using techniques as described in later paragraphs. The control unit 124 may further be coupled with a display unit 128 to display the determined topography.

The apparatus 100 further comprises a holder 130 configured to receive the work-piece 102. The holder 130 is an XY stage capable of movement in an x-y axis. The holder 130 is coupled with the control unit 124 via a coupling mechanism 132 such as a cable. The control unit 124 is further configured to impart a linear motion in the x-y plane to the holder 130 while the light emitting assembly 104 remains stationary. As such, the emitted beam 106 is caused to scan across the surface S of the work-piece 102 in a scanning direction corresponding to the linear motion of the holder 130. As the emitted beam 106 is scanned across the surface S of the of the work-piece 102 in the scanning direction, the detector 112 is further configured to generate a series of signals indicative of positions of the reflected beam 114 on the detector 112. The control unit 124 is further configured to determine the topography of the surface based on the series of signals. Multiple scanned areas can be implemented to provide the control unit 124 with additional data to calculate a more accurate curvature of the work-piece 102.

Further, the surface S of the work-piece 102 is provided with a thin film (not shown in the figure) in a manner as known in the art, for manufacturing various semiconductor devices such as integrated devices, three-dimensional electronic circuits, systems-on-a-chip structures, lithographic reticles, flat panel display systems, etc. Accordingly, the control unit 124 is further configured to determine stress imparted on the film formed on the surface S of the work-piece 102 based on the determined topography. To this end, in one implementation, the control unit 124 obtains a blank topography of the work-piece 102 prior to application of the film on the surface S of the work-piece 102. Such blank topography can be obtained in a similar manner as described above. The control unit 124 can save such blank topography in a memory (not shown in the figure) and then fetch the blank topography from the memory during the determination of the stress. Upon obtaining, the control unit 124 processes the blank topography and the determined topography to determine the stress imparted on the film. In an example, the control unit 124 determines a slope of the surface S from which topography is found as a vertical displacement of the work-piece based on the comparison between the blank topography and the determined topography, and detects a stress value in the film provided/deposited on the work-piece 102 based on the vertical displacement using techniques as known in the art. The control unit 124 may further display the determined stress on the display unit 128.

Figure 2:
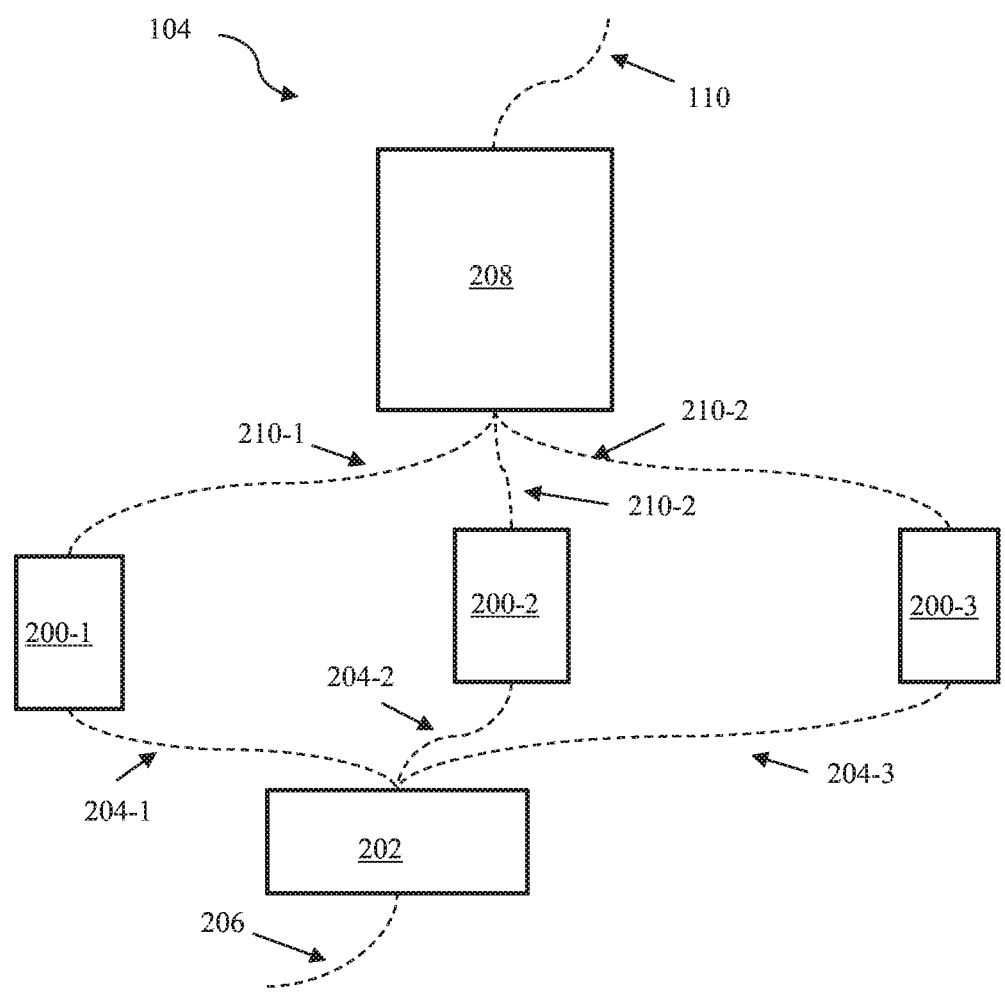
FIG. 2 schematically illustrates a light emitting assembly employed in the apparatus shown in FIG. 1, in accordance with an embodiment of the present subject matter.

FIG. 2 schematically illustrates the light emitting assembly 104 employed in the apparatus 100 shown in FIG. 1, in accordance with the embodiment of the present disclosure. The light emitting assembly 104 comprises at least three light sources 200-1, 200-2, and 200-3 (hereinafter referred as light sources 200 to denote the plural form). Examples of the light sources include, but not limited to, laser sources and light emitting diodes. Each of the at least three light sources 200 emit electromagnetic radiation at a wavelength selected from the plurality of wavelengths. As would be understood, each of light sources emits electromagnetic radiation having different wavelengths. In an example, the light sources can emit electromagnetic radiation at any wavelength selected from 405 nanometers (nm), 520 nm, 635 nm, 658 nm, and 780 nm. For the purpose of clarity in the description, the description supposes three optical light sources. It will be appreciated by those of ordinary skill in the art that the various embodiments described in the present disclosure are not so limited, and that the present disclosure is applicable for any (e.g., reasonable—smaller than ten or twenty) number of optical light sources.

As described earlier, the emitted beam 106 is with a modulating frequency to enable removal of noise, i.e., thermal background light, during detection of the position of the light beam on the detector 112. Consequently, the light emitting assembly 104 modulates each of electromagnetic radiations emitting from the at least three light sources 200 with the modulating frequency. Therefore, the light emitting assembly 104 further includes a multi-frequency multichannel current supply 202 configured to provide a current for the at least three light sources 200-1, 200-2, and 200-3, via coupling mechanisms 204-1, 204-2, and 204-3, respectively, such as cables. The multi-frequency multichannel current supply 202 may provide reference signal synchronized with the currents driving the light sources 200-1, 200-2, and 200-3, by means a coupling mechanism 206 such as a multi-wire electrical cable to modulate the emitted electromagnetic radiations. The multi-frequency multichannel current supply 202 may modulate the electromagnetic radiations using techniques as known in the art.

The light emitting assembly 104 further includes a beam combiner 208 coupled to the at least three light sources 200-1, 200-2, and 200-3 via single mode optical fibers 210-1, 210-2, and 210-3, respectively. The beam combiner 208 is configured to combine the electromagnetic radiation thus modulated into the emitted beam 106. Thus, the electromagnetic radiations are modulated prior to the emitted beam 106 being directed onto the surface S of the workpiece 102 and the emitted beam 106 emerging out of the beam combiner 208 is a multicolor frequency modulated beam. As would be understood, the single mode optical fibers 210 allow nearly lossless combining of the electromagnetic radiation by the beam combiner 208. In addition, maintenance of the light emitting assembly 104 is easier as a realignment of the light emitting assembly 104 may be reduced or eliminated in case any repair and/or replacement.

Further, the beam combiner 208 transmits the emitted beam 106 via the single mode optical fiber 110 to the first beam directing unit 108. Thus, the emitted beam 106 emerging from the single mode optical fiber 110 has a better beam quality, is significantly more uniform, and may closely resemble a Gaussian beam shape. The emitted beam 106 may also be symmetric with respect to the rotation, or symmetric with respect to the transformation of rotation if a rotational motion is imparted on the holder 130. Thus, the emitted beam 106 can be easily collimated using achromatic optics (not shown in the figure) into improved or nearly perfect collinear beam. Such a collinear multicolor beam enables easier measurement of the topography of the workpiece 102 at every individual wavelength and may result in the same or substantially the same measurement value at each wavelength.

Figure 3B:
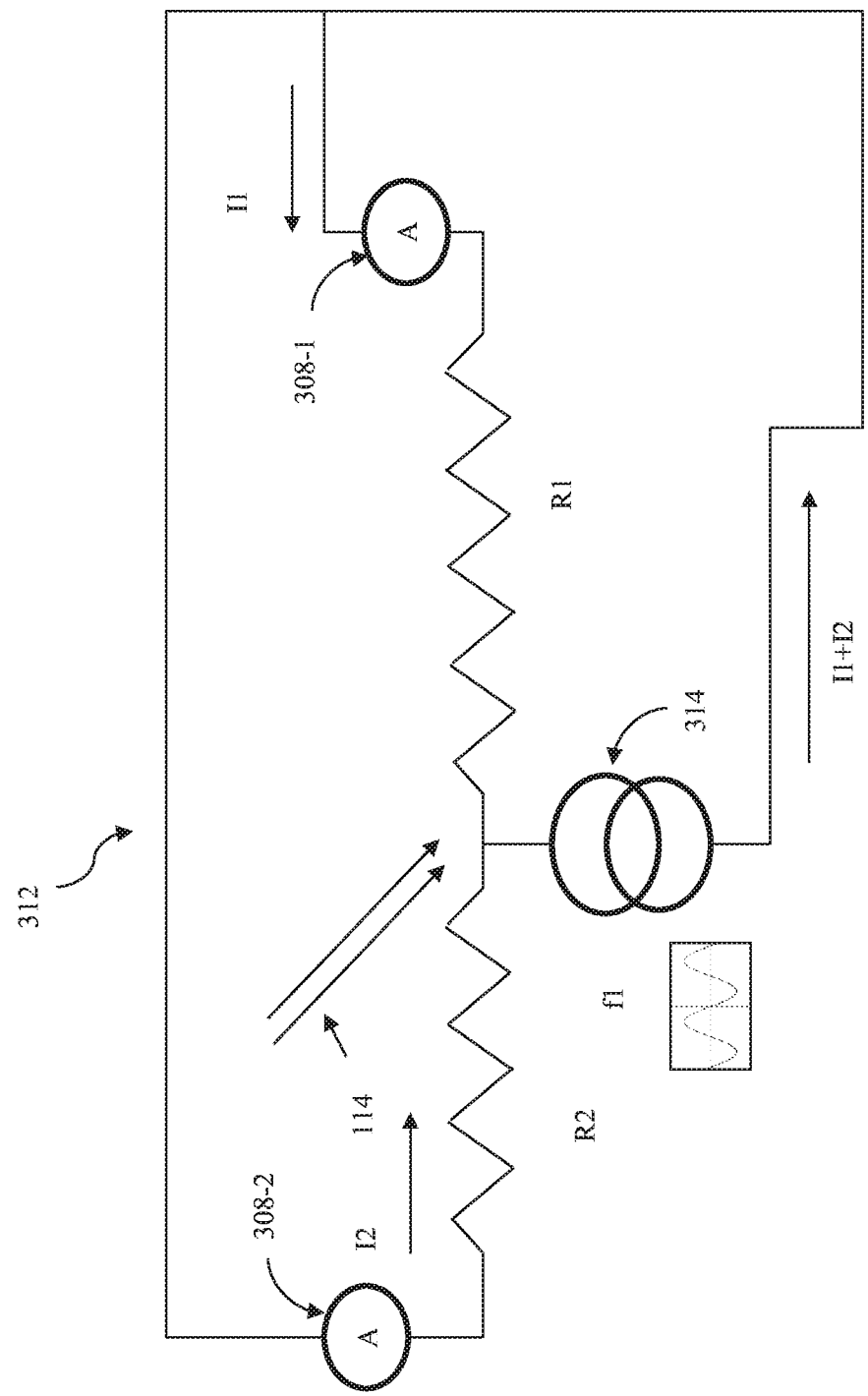

FIG. 3a and FIG. 3b schematically illustrates the detector 112 employed in the apparatus 100 shown in FIG. 1. As described earlier, the detector 112 is selected from a group comprising of 1D PSD and 2D PSD. As would be understood, the PSD is based on silicon PIN diode technology and is used to measure the position of the integral focus of an incoming light signal. A light spot on the PSD, for instance, is converted into a continuous electrical signal corresponding to the focal position of this spot. The position of the beam spot is derived from the relationship between two output currents.

Referring to the FIG. 3a, a sectional view 300 of the 1D PSD as the detector 112 is illustrated. The detector 112 includes PN junction 302. Top part/layer 304, e.g., n layer, of the junction 302 may be thin and may have significant resistance, while lower part/layer 306, e.g., p layer, of the junction 302 may be thick, heavily doped and its resistance may be negligible. The top layer 304 is connected to two ammeters, i.e., ammeter 308-1 at one end and ammeter 308-2 at another end of the junction 302. The lower layer 306 of the junction 302 is connected to a voltage source 310. The reflected beam 114 impinges the top layer 304 of the junction 302 at point P1, which is located at distance X1 from one end of the junction 302 and distance X2 from the other end of the junction 302. The reflected beam 114 is modulated at frequency f1. The reflected beam 114 generates a current flowing through the PN junction that is proportional to light intensity, and may be modulated at the same or substantially the same frequency as intensity modulated beam. The illuminated spot at location P1 behaves as a current source, where the magnitude of the current corresponds to light intensity only, and does not depend on location (values X1, X2). As would be understood, the PSD gives a position of the incident light making it practically insensitive to light spot shape or size, as long as it is not larger than the detector. Stray light and leakage current can be compensated for, to get a good position determination as long as the PSD stays in the linear region and does not saturate.

Referring to FIG. 3b, an example equivalent circuit 312 of the 1D PSD as the detector 112 is illustrated. The illuminated spot is modeled by current source 314 having frequency f1, which may be the same or substantially the same as frequency f1 used for modulating the reflected beam. The current source 314 generates current I1 and I2. The two resistances, R1 and R2, of the top layer 304 are may be proportional (e.g., completely proportional in some instances) to the distances X1 and X2, respectively, from the beam spot. This means that the ratio of the two currents, I1 and I2, may give a relatively accurate position of the beam spot. As can be gathered from the figure, the relationship between the currents I1 and I2 and the resistors R1 and R2 can be determined as, $$\frac{I1}{I2} = \frac{R2}{R1}$$

Consequently, the relationship between the currents I1 and I2 and the distances X1 and X2 can be determined as, $$\frac{I1}{I2} = \frac{X2}{X1}$$

Therefore, based on the total length of the PSD, i.e., X1+X2, and values of current I1, I2, the values of distances X1, and X2 can be determined.

Now the signal processing unit 118 can be used to reject noise from the generated signal indicative of the position given by X1 and X2, as described below.

Figure 4A:
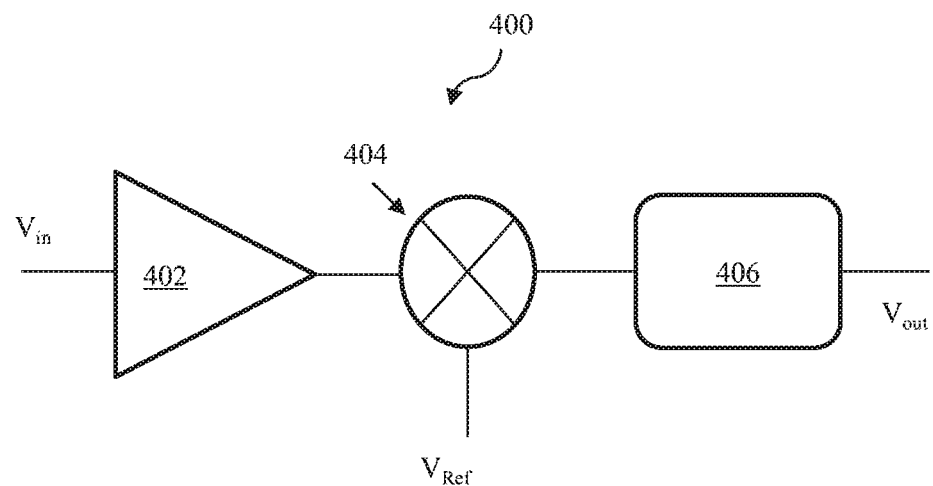
FIG. 4a, FIG. 4b, and FIG. 4c schematically illustrates a signal processing unit employed in the apparatus shown in FIG. 1, in accordance with an embodiment of the present subject matter.
Figure 4B:
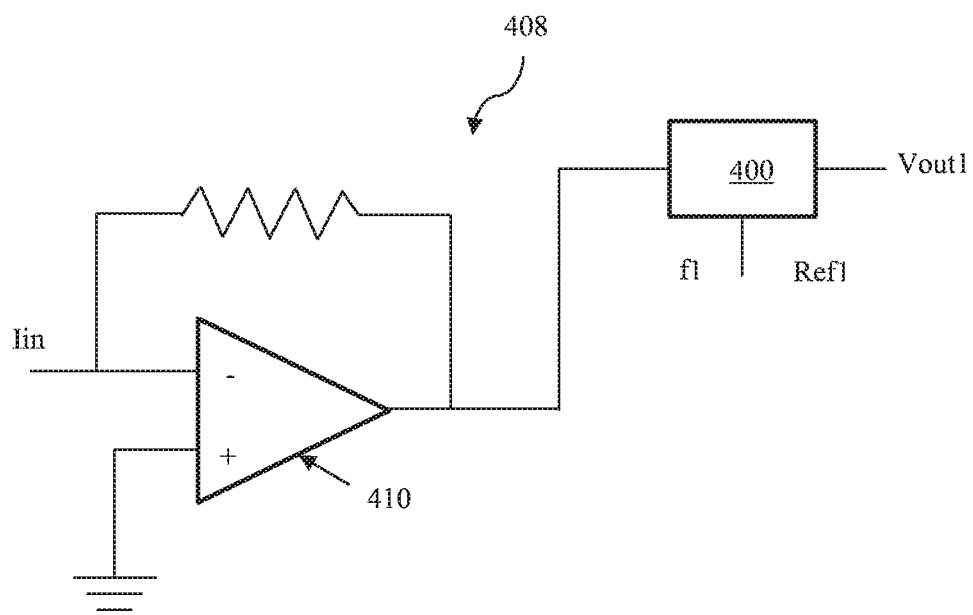
Figure 4C:
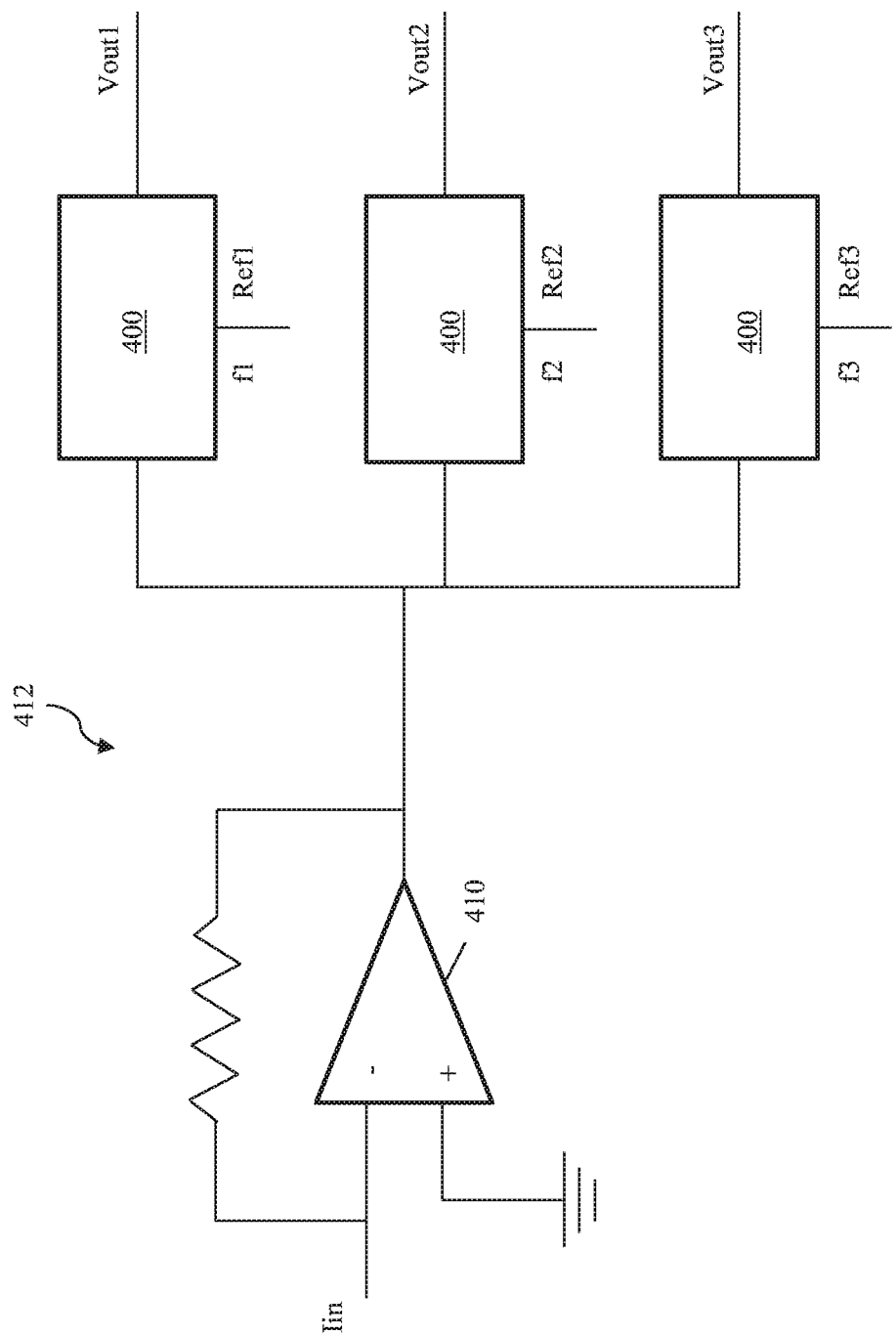

FIG. 4a, FIG. 4b, and FIG. 4c schematically illustrates the signal processing unit 118 employed in the apparatus 100 shown in FIG. 1. As described earlier, the signal processing unit 118 is selected from a group comprising of phase sensitive detector, a low-noise amplifier, analog lock-in amplifier and a digital lock-in amplifier.

Referring to FIG. 4a, an example equivalent circuit of lock-in amplifier 400 is illustrated. The lock-in amplifier 400 includes an amplifier 402, a mixer 404, and a low pass filter 406. The lock-in amplifier 400 when operating with a reference signal having a frequency much larger than the cutoff frequency of the low pass filter 406 is used to reject noise in which signal may be buried. The output function of the lock-in amplifier at given time t=0 s is given by:

$$V_{out} = \int_{\infty}^{0} V_{in}(t) * V_{ref}(t) * e^{\frac{t}{T}} * dt$$

Where $V_{in}$, is input voltage;
$V_{ref}$ is reference signal normalized so it does have amplitude 1 (unit less); and
T is the time constant related to the cutoff frequency of the low pass filter 406; for (t)=cos ωt, Vout becomes a cosine component of transform of Vin of frequency ω.
All other components of Vin are rejected.

Thus, in practice, it may be quite easy to reject white noise having an amplitude larger (e.g., approx. 100000×) than the signal. Therefore, this technique can be easily used to separate the signal of known frequency and phase. In other words, the detection of the weak or polluted signal is synchronized with the known reference signal.

In the present disclosure, the lock-in amplifier 400 together with PSD or the detector 112 may be used to separate signal having known frequency and phase (same as current exciting light sources 200-1, 200-2, and 200-3 employed in the apparatus 100), from other not synchronized sources of radiation. As would be understood, the lock-in amplifiers can be typically supplied with either sinusoidal or square wave reference signals. Thus, the lock-in amplifier 400 is synchronized or tuned with a reference signal the same or substantially the same as the modulating frequency of the light sources 200-1, 200-2, and 200-3.

Referring to FIG. 4b, an example equivalent circuit 408 of the signal processing unit 118 is illustrated that will be employed with the PSD or the detector 112 for measuring current in phase sensitive, synchronized manner when the multi-wavelength beam is modulated a frequency f1, i.e., reflected beam 114b, impinges on the PSD. A trans-impedance amplifier 410 may be placed in front of the lock-in amplifier 400. As such, the lock-in amplifier 400 can be readily used to measure current components flowing through the input having frequency f1 when rejecting all other current.

In a similar manner, the signal processing unit 118 can be used for removing noise when each of electromagnetic radiations forming the emitted beam 106 is modulated at substantially different frequencies. Accordingly, the signal processing unit 118 may include a plurality of lock-in amplifiers 400. Each of the plurality of lock-in amplifiers 400 has a reference signal the same as or substantially the same as the modulating frequency of each of the light sources 200-1, 200-2, and 200-3. Referring to FIG. 4c, an example equivalent circuit 412 of the signal processing unit 118 comprising of a plurality of lock-in amplifiers 400 is illustrated that is employed with the PSD or the detector 112 for measuring current in phase sensitive, synchronized manner when the multi-wavelength beam is modulated at different frequencies i.e., f1, f2, and f3. For the sake of brevity, only three frequencies have been illustrated. The plurality of lock-in amplifiers 400 is coupled in a parallel-connection to the output of the trans-impedance amplifier 410. This arrangement allows simultaneous measurement of the current signals at several different frequencies, i.e., f1, f2, f3.

Figure 5:
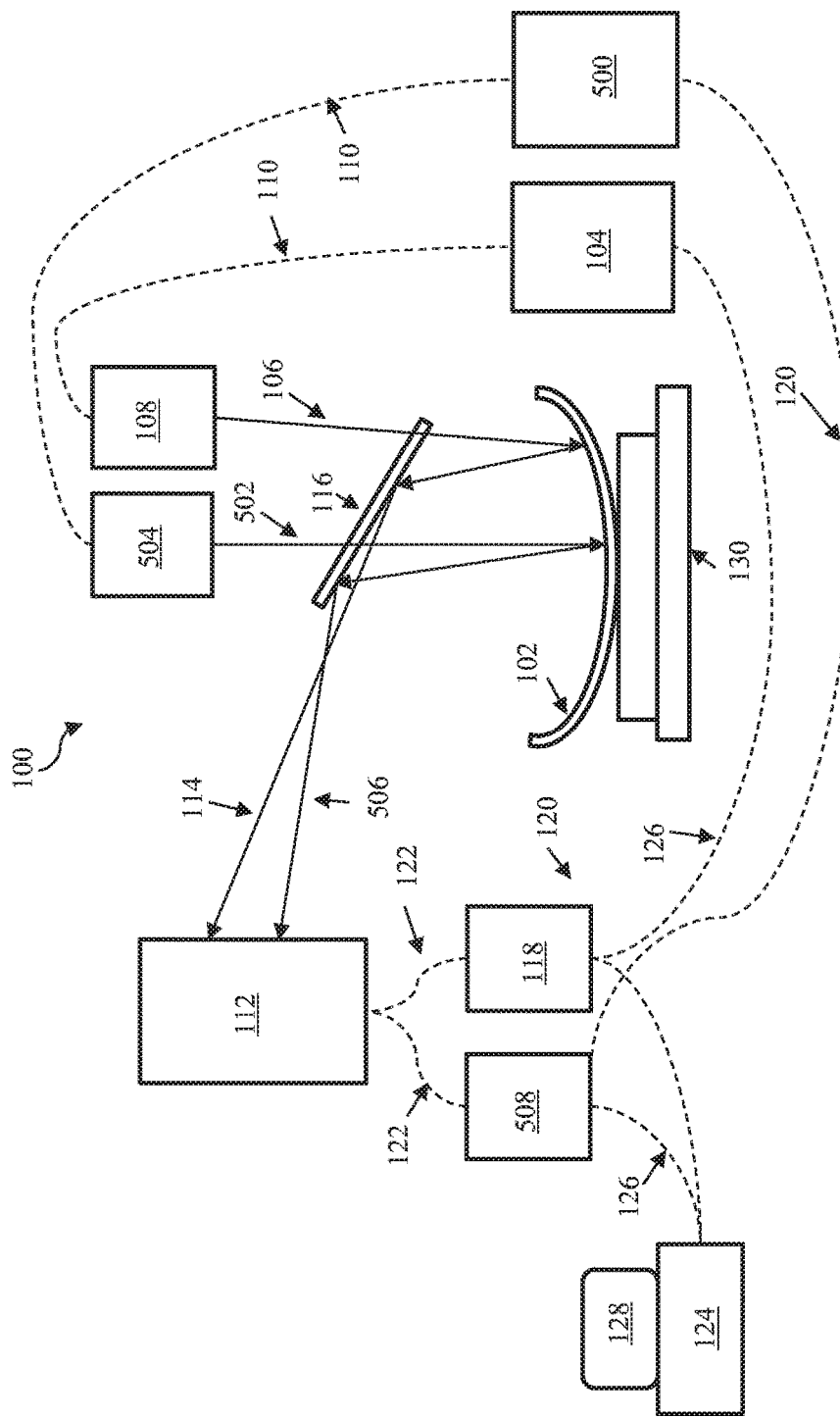
FIG. 5 schematically illustrates an apparatus for measuring surface topography of a work-piece, in accordance with one another embodiment of the present subject matter.

FIG. 5 schematically illustrates the apparatus 100 for measuring surface topography of the work-piece 102, in accordance with another embodiment of the present subject matter. For the sake of brevity and clarity, the reference numerals of already described units/parts have been retained. In such embodiment, the apparatus 100 includes at least one further light emitting assembly in addition to the light emitting assembly 104 (hereinafter referred to as first light emitting assembly 104 for sake of clarity). Thus, the apparatus 100 includes the first light emitting assembly 104 and a second light emitting assembly 500. The first light emitting assembly 104 is configured to generate a first emitted beam 106, as described earlier. The first emitted beam 106 is emitted at a plurality of wavelengths and is modulated at a first modulating frequency.

The second light emitting assembly 500 is configured to emit a second emitted beam 502, in a manner similar to the first emitted beam 106 emitted by the first light emitting assembly 104. Thus, the second emitted beam 502 is emitted at a plurality of wavelengths and is modulated at a second modulating frequency. To this end, the second light emitting assembly 500 comprises at least three light sources (not shown in the figure), in a manner as described in FIG. 2. Each of the at least three light sources emit electromagnetic radiation at a wavelength selected from the plurality of wavelengths and modulated with the second modulating frequency. The second modulating frequency is substantially different from the first modulating frequency.

Further, the second emitted beam 502 and the first emitted beam 106 are simultaneously directed onto the surface S of the work-piece 102 such that both the beams impinge on the surface S of the work-piece 102 at different positions. Accordingly, the apparatus further includes a third beam directing unit 504 similar to the first beam directing unit 108.

Further, the detector 112 receives a first reflected beam 114 of light and second reflected beam 506. The detector 112 is disposed at a fixed position in a plane containing the first reflected beam 114 and the second reflected beam 506. As described earlier, the first reflected beam 114 of light that includes at least a portion of the first emitted beam 106 as reflected from the surface S of the work-piece 102. The second emitted beam 502 includes at least a portion of the second emitted beam 502 as reflected from the surface S of the work-piece 102. As described earlier, the apparatus 100 includes the second beam directing unit 116 configured to direct a reflected beam from the surface S of the work-piece 102 to the detector 112. As such, the second beam directing unit 116 directs the first reflected beam 114 and the second reflected beam 506 impinge on the detector 112 simultaneously but at different positions.

The detector 112 then generates a first signal indicative of a position of the first reflected beam 114 on the detector 112 based on the first modulating frequency. Simultaneously, the detector 112 generates a second signal indicative of a position of the second reflected beam 506 on the detector 112 based on the second modulating frequency. Since the first modulating frequency and the second modulating frequency are substantially different, the detector 112 is able to generate signals indicative of positions of the first reflected beam 114 and the second reflected beam 506 simultaneously. Thus, the detector 112 receives two reflected beams at two different positions and provides corresponding signals indicative two different positions simultaneously, as described below.

FIG. 6a, FIG. 6b, FIG. 6c, and FIG. 6d schematically illustrate the detector 112 employed in the apparatus 100 shown in FIG. 5 for simultaneously detecting the position of multiple beams impinging on the detector 112. As described earlier, the detector 112 is selected from a group comprising of 1D PSD and 2D PSD. As would be understood, the PSD is based on silicon PIN diode technology and is used to measure the position of the integral focus of an incoming light signal. A light spot on the PSD, for instance, is converted into a continuous electrical signal corresponding to the focal position of this spot. The position of a direction is derived from the relationship between two output currents.

Figure 6A:
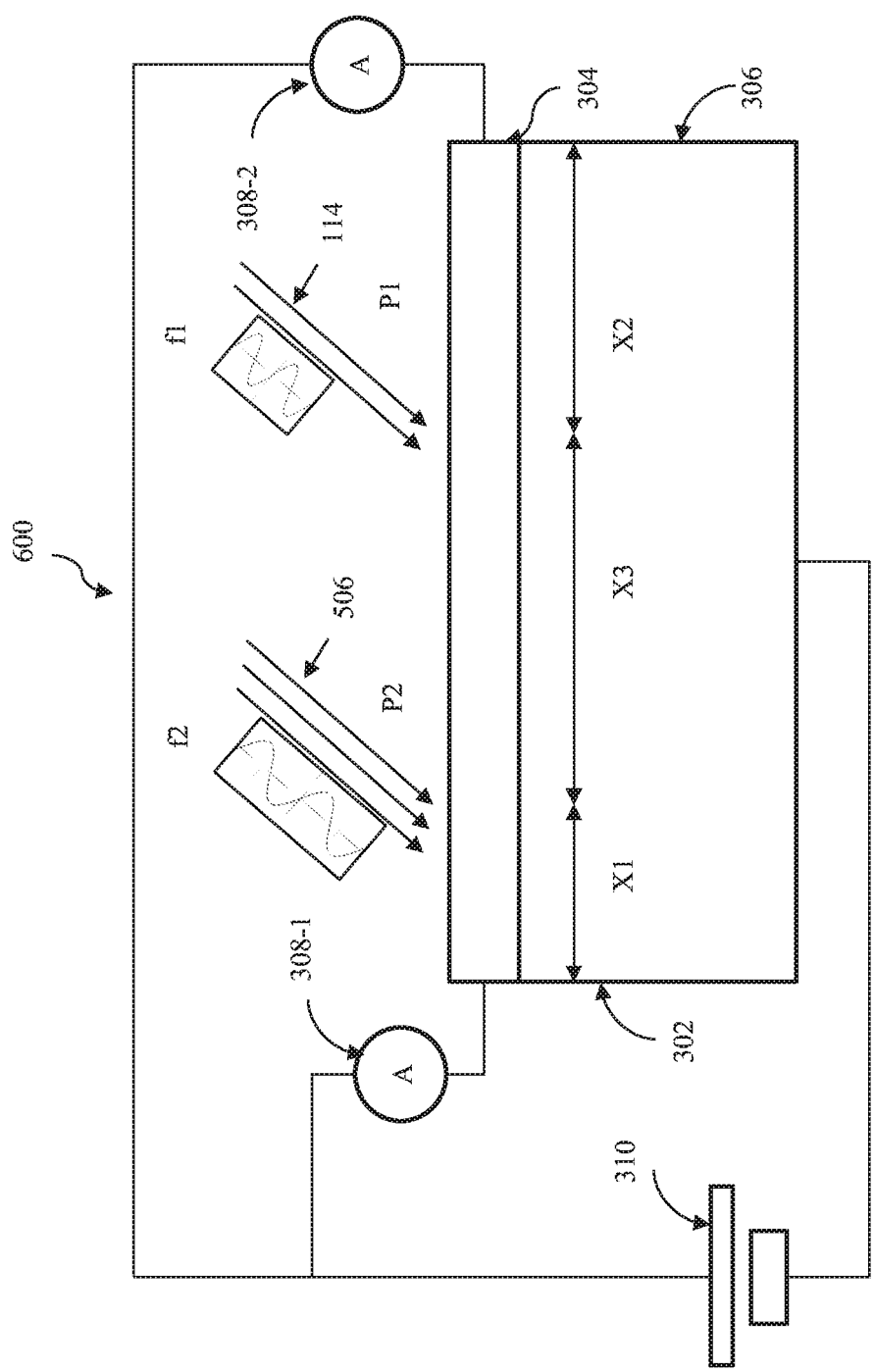
FIG. 6a, FIG. 6b, FIG. 6c, and FIG. 6d schematically illustrate the detector employed in the apparatus shown in FIG. 5, in accordance with one another embodiment of the present subject matter.

Referring to the FIG. 6a, a sectional view 600 of the 1D PSD as the detector 112 is illustrated. The detector 112 includes PN junction 302. Top part/layer 304, i.e., n layer of the junction 302 may be thin and may have significant resistance. Lower part/layer 306, i.e., p layer of the junction 302 may be thick, heavily doped and its resistance may be negligible. The top layer 304 is connected to two ammeters, i.e., ammeter 308-1 at one end and ammeter 308-2 at other end of the junction 302. The lower layer 306 is connected to a voltage source 310. The first multi-wavelength reflected beam 114 and the second multi-wavelength reflected beam 506 have different intensities and are modulated at two different frequencies f1 and f2, respectively. The first multi-wavelength reflected beam 114 and the second multi-wavelength reflected beam 506 simultaneously impinge on the PSD or the detector 112 at two different spots P1 and P2, respectively. As such, the point P1 is located at distance X1 from one end of the junction 302 and the point P2 is located at distance X2 from other end of the junction 302. The distance between the points P1 and P2 is X3. Consequently, the point P1 is located at distance X1 from one end of the junction 302 and at distance (X2+X3) from the other end of the junction 302. Likewise, the point P2 is located at distance X2 from one end of the junction 302 and at distance (X1+X3) from the other end of the junction 302. The detector 112 is operating in a linear region. As such, stray light and leakage current can be compensated for, to get a good position determination.

Figure 6B:
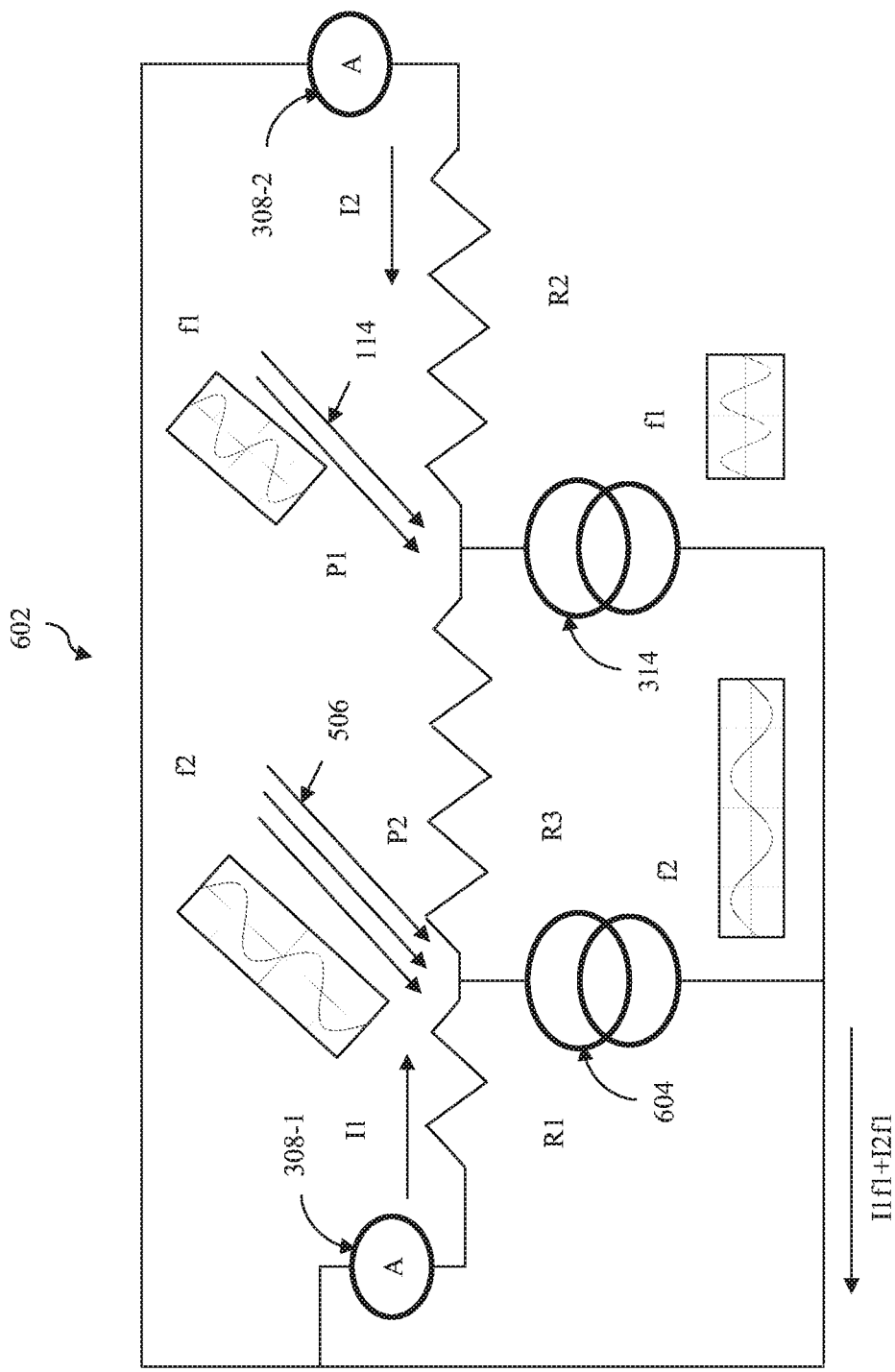

Referring to FIG. 6b, an example equivalent circuit 602 of the 1D PSD as the detector 112 is illustrated. In this case, as described above, each spot becomes a separate and independent current source, one operating at frequency f1, and another operating at frequency f2. Thus, the illuminated spot P1 is modeled with a current source 314 having frequency f1, which may be the same or substantially the same as frequency f1 used for modulating the reflected beam 114. The illuminated spot P2 is modeled with a current source 604 having frequency f2, which may be the same or substantially the same as frequency f2 used for modulating the reflected beam 506. The current sources generate current I1 and I2. The three resistances, R1, R2, and R3, of the top layer, may be proportional (e.g., completely proportional in some instances) to the distances X1, X2, and X3, respectively. This means that the ratio of the two currents, I1 and I2, may give a relatively accurate position of the beam spots.

To analyze the circuit 602, superposition principle for circuits is used. That is, the total current in any part of a linear circuit equals the algebraic sum of the currents produced by each source separately. To this end, all other voltage sources may be replaced by short circuits and all other current sources are replaced by open circuits.

Figure 6C:
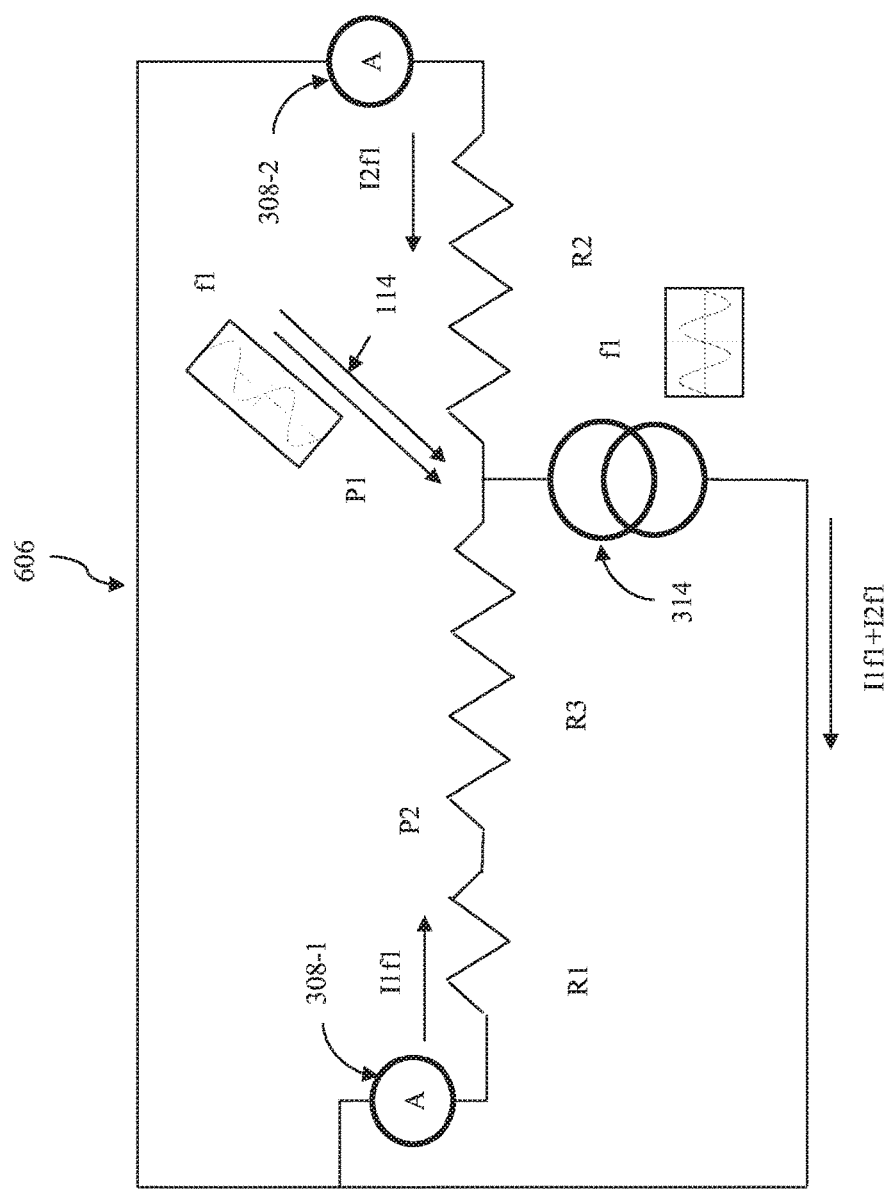
Figure 6D:
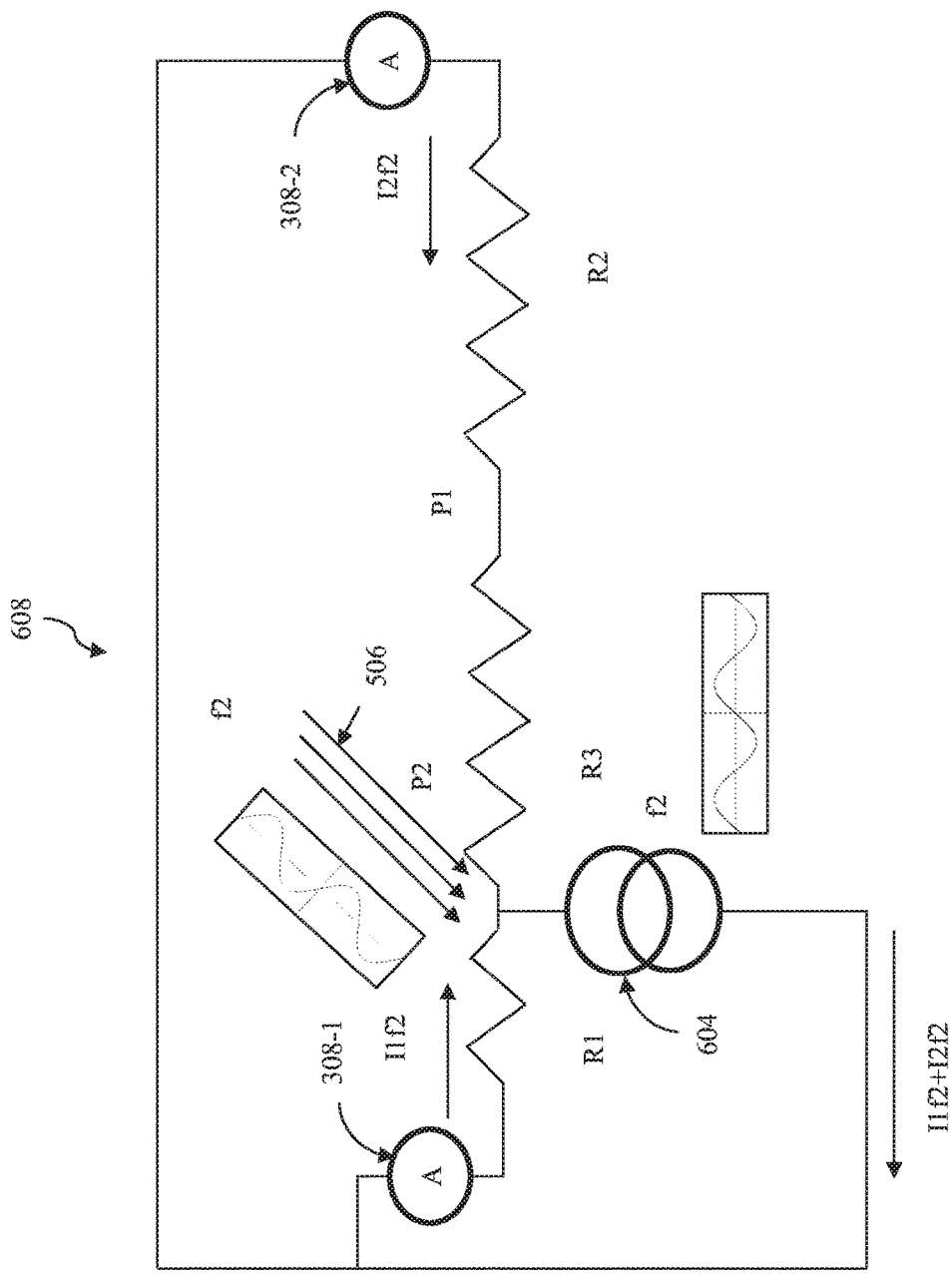

Accordingly, FIG. 6c illustrates an example equivalent circuit 606 of the 1D PSD as the detector 112 for measuring beam spot at location P1. The current source 314 operating at the modulating frequency f1 generates current I1/1 and I2/1. The two resistances, R1, R2, and R3, of the top layer 304 may be proportional (e.g., completely proportional in some instances) to the distances X1, X2, and X3, respectively, from the beam spot P1. FIG. 6d illustrates an equivalent circuit 608 of the 1D PSD as the detector 112 for measuring beam spot at location P2. The current source 604 operating at the modulating frequency f2 generates current I1/2 and I2/2. The two resistances, R1, R2, and R3, of the top layer, may be completely proportional (e.g., completely proportional in some instances) to the distances X1, X2, and X3, respectively, from the beam spot P2.

Now, by applying the superposition principle, the current I1 and I2 are calculated as:

$$I1 = I1f1 + I1f2;$$

$$I2 = I2f1 + I2f2$$

However, the currents I1/1 and I2/1 have frequency f1 and same or substantially the same phase, while currents I1/2 and I2/2 have frequency f2 and same or substantially the same phase. These currents can be simultaneously measured using two ammeters. From these current measurements, the position of beam spot P1 and P2 can be determined as described in reference to FIG. 3b. Therefore, as can be gathered from FIG. 6c, the relationship between the currents I1 and I2 generated by current source operating at modulating frequency f1 and the resistors R1, R2, and R3 can be determined as, $$\frac{I1}{I2} = \frac{R2}{R1 + R3}$$

Consequently, the relationship between the currents I1 and I2 and the distances X1, X2, and X3 can be determined as, $$\frac{I1}{I2} = \frac{X2}{X1 + X3}$$

Likewise, as can be gathered from FIG. 6d, the relationship between the currents I1 and I2 generated by current source operating at modulating frequency f2 and the resistors R1, R2, and R3 can be determined as $$\frac{I1}{I2} = \frac{R2 + R3}{R1}$$

Consequently, the relationship between the currents I1 and I2 and the distances X1, X2, and X3 can be determined as, $$\frac{I1}{I2} = \frac{X2 + X3}{X1}$$

Thus, the positions of the two beams may be measured separately but simultaneously and yet the two beams may not interfere with each other as the PSD or the detector 112 operates in a linear region and is not saturated. In a similar manner, the position of beam spots formed by multiple beams having distinct modulation frequencies impinging on the PSD can be determined.

Now, as described earlier, the apparatus 100 is configured to remove noise from a signal generated by the detector 112. Referring to FIG. 5 again, the apparatus 100 comprises a first signal processing unit 118 configured to remove noise from the first signal indicative of a position of the first reflected beam 114 based on the first modulating frequency. The apparatus 100 further includes a second signal processing unit 508 configured to remove noise from the second signal indicative of a position of the second reflected beam 506 based on the second modulating frequency As described earlier, the first signal processing unit 118 is synchronized or tuned with the first modulating frequency. As such, the first signal processing unit 118 is coupled with the first light emitting assembly 104 via the coupling mechanism 120. The first signal processing unit 118 is coupled with the detector 112 via the coupling mechanism 122. The first signal processing unit 118 is coupled with the control unit 124 via the coupling mechanism 126. In a similar manner, the second signal processing unit 508 may be substantially synchronized or tuned with the second modulating frequency. As such, the second signal processing unit 508 is coupled with the second light emitting assembly 500 via the coupling mechanism 120. The second signal processing unit 508 is coupled with the detector 112 via the coupling mechanism 122. The second signal processing unit 508 is coupled with the control unit 124 via the coupling mechanism 126. This enables separation of the signal generated by the detector 112 that has known frequency and phases from other sources of radiation, which are not synchronized. Thus, the second signal processing unit 508 receives the signal generated by the detector 112 and removes noise from the signal, in a manner similar to the first signal processing unit 118 as described above in reference to FIG. 4b.

Upon removing the noise from the first signal, the first signal processing unit 118 generates a first processed signal and transmits the first processed signal to the control unit 124, as described earlier. Similarly, upon removing the noise from the first signal, the second signal processing unit 508 generates a second processed signal and transmits the processed signal to the control unit 124. The control unit 124 then determines the topography of the surface S of the work-piece 102 based on the first processed signal and the second processed signal. In this manner, multiple emitted beams can be directed towards the surface S of the work-piece and multiple reflected beams can be received by the detector. This enables the use of multi-beam non-scanning approach for determination of topography as now multiple beams can be directed towards the work-piece simultaneously without having to rotate the holder 130. As such, noise may be reduced or eliminated and performance may be improved. In addition, the work-piece 102 may become less exposed to thermal radiation.

Figure 7:
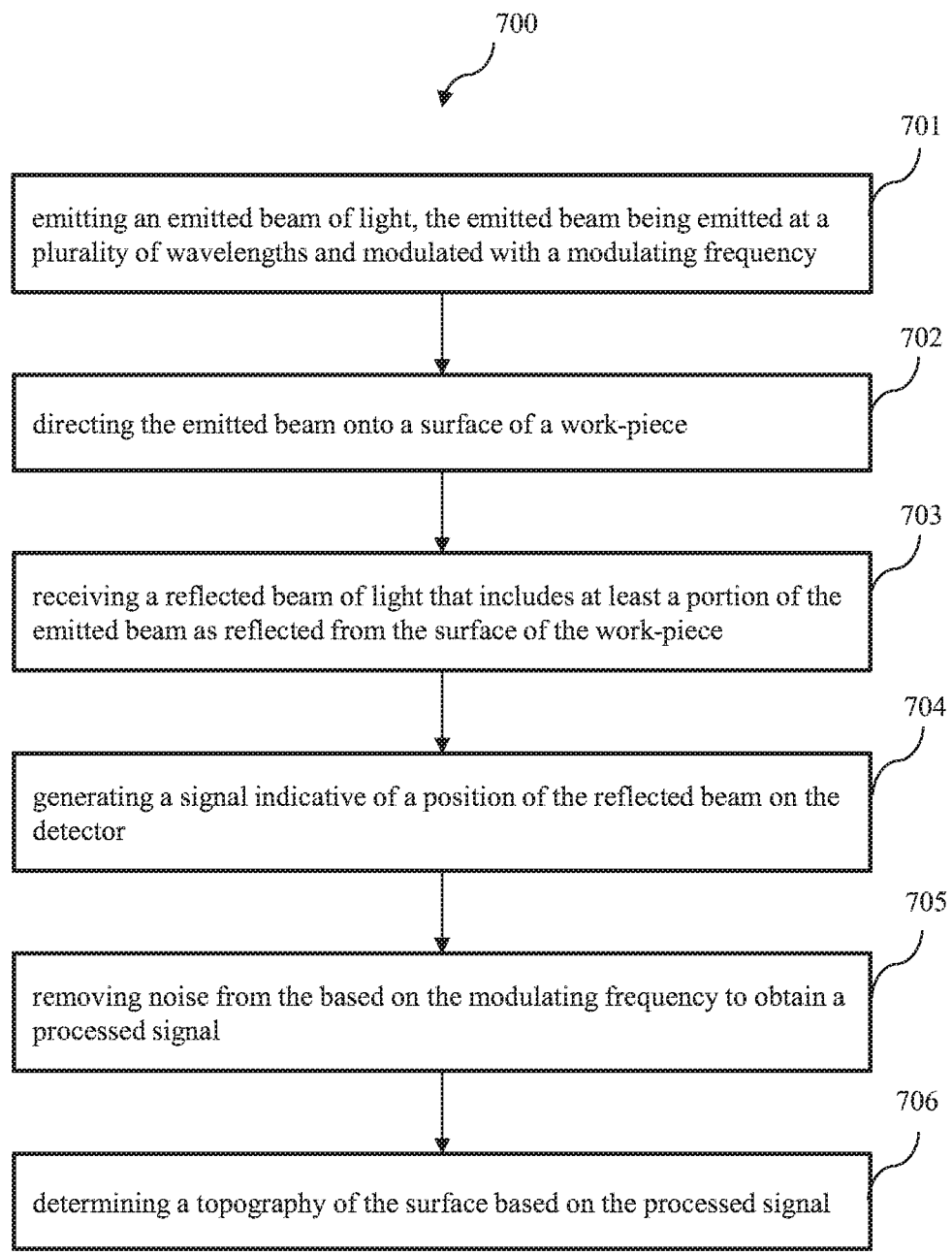
FIG. 7 illustrates a flow diagram of a method for measuring surface topography of a work-piece, in accordance with an embodiment of the present subject matter.

FIG. 7 illustrates a flow diagram of a method 700 for measuring surface topography of a work-piece, in accordance with an embodiment of the present subject matter. The method 700 comprises at step 701, emitting an emitted beam of light, the emitted beam is emitted at a plurality of wavelengths and modulated with a modulating frequency. The method 700 comprises at step 702, directing the emitted beam onto a surface of a work-piece. The method 700 comprises at step 703, receiving a reflected beam of light that includes at least a portion of the emitted beam as reflected from the surface of the work-piece. The method 700 comprises at step 704, generating a signal indicative of a position of the reflected beam on the detector. The method 700 comprises at step 705, removing noise from the signal thus generated on the modulating frequency to obtain a processed signal. The method 700 comprises at step 706, determining the topography of the surface based on the processed signal.

Further, the method 700 comprises emitting at least three electromagnetic radiations at a wavelength selected from the plurality of wavelengths; and combining the electromagnetic radiations into the emitted beam.

Further, the method 700 comprises modulating each of electromagnetic radiations with the modulating frequency. The method 700 further comprises combining the electromagnetic radiations thus modulated into the emitted beam.

Figure 8:
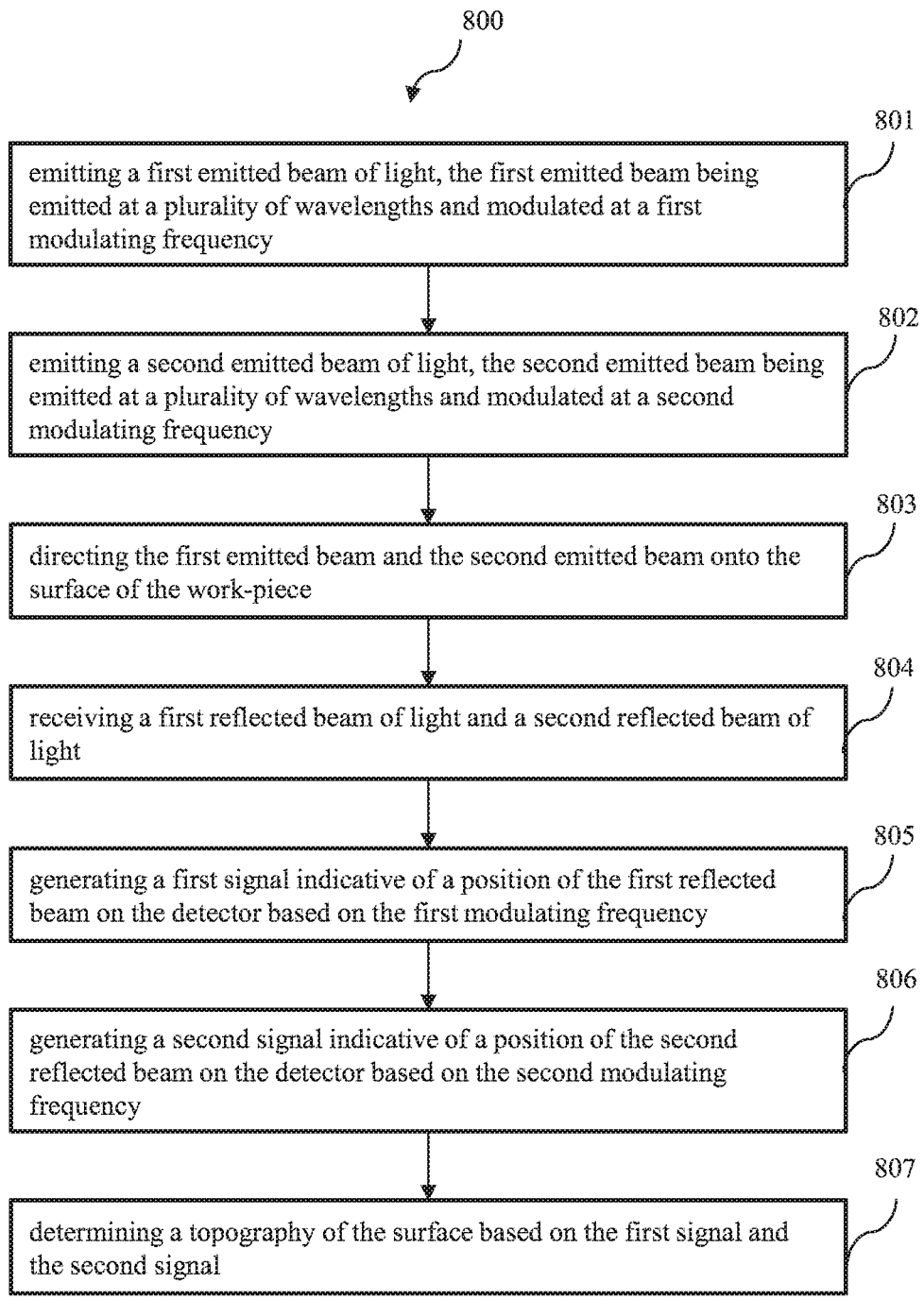
FIG. 8 illustrates a flow diagram of a method for measuring surface topography of a work-piece, in accordance with one another embodiment of the present subject matter.

FIG. 8 illustrates a flow diagram of a method 800 for measuring surface topography of a work-piece, in accordance with one another embodiment of the present subject matter. The method 800 comprises at step 801, emitting a first emitted beam of light, the first emitted beam being emitted at a plurality of wavelengths and modulated at a first modulating frequency. The method 800 comprises at step 802, emitting a second emitted beam of light, the second emitted beam being emitted at a plurality of wavelengths and modulated at a second modulating frequency. The second modulating frequency is substantially different from the first modulating frequency. The method 800 comprises at step 803, directing the first emitted beam and the second emitted beam onto the surface of the work-piece. The method 800 comprises at step 804, receiving a first reflected beam of light and a second reflected beam of light. The first reflected beam includes at least a portion of the first emitted beam as reflected from the surface of the work-piece. The second reflected beam includes at least a portion of the second emitted beam as reflected from the surface of the work-piece.

The method 800 comprises at step 805, generating a first signal indicative of a position of the first reflected beam on the detector based on the first modulating frequency. The method 800 comprises at step 806, generating a second signal indicative of a position of the second reflected beam on the detector based on the second modulating frequency. The method 800 comprises at step 807, determining the topography of the surface based on the first signal and the second signal.

Further, the method 800 comprises removing noise from the first signal based on the first modulating frequency. The method 800 comprises removing noise from the second signal based on the second modulating frequency.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present subject matter has been presented for purposes of example rather than limitation, and does not preclude inclusion of such modifications, variations, and/or additions to the present subject matter as would be readily apparent to one of ordinary skill in the art.

To the extent that method or apparatus embodiments herein are described as having certain numbers of elements, it should be understood that fewer than all of the elements may be necessary to define a complete claim. In addition, sequences of operations or functions described in various embodiments do not require or imply a requirement for such sequences in practicing any of the appended claims. Operations or functions may be performed in any sequence to effectuate the goals of the disclosed embodiments.

What is claimed is:

1. An apparatus for measuring surface topography comprising:
   a light emitting assembly configured to emit an emitted beam of light, the emitted beam being emitted at a plurality of wavelengths and being modulated with a modulating frequency, the emitted beam being directed onto a surface of a work-piece;
   a detector configured to:
     receive a reflected beam of light that includes at least a portion of the emitted beam as reflected from the surface of the work-piece; and
     generate a signal indicative of a position of the reflected beam on the detector; and
   a signal processing unit configured to remove noise from the signal thus generated based on the modulating frequency to obtain a processed signal; and
   a control unit configured to:
     determine a topography of the surface based on the processed signal.

2. The apparatus as claimed in claim 1, wherein the light emitting assembly comprises:
   at least three light sources, each of the at least three light sources emitting electromagnetic radiation at a wavelength selected from the plurality of wavelengths; and a beam combiner configured to combine the electromagnetic radiation from each of the at least three light sources into the emitted beam.

3. The apparatus as claimed in claim 2, wherein the light emitting assembly is further configured to:
modulate each of electromagnetic radiations with the modulating frequency; and
generate the emitted beam by combining the electromagnetic radiations thus modulated prior to the emitted beam being directed onto the surface of the work-piece.

4. The apparatus as claimed in claim 1, wherein the detector is selected from a group comprising of a one-dimensional position sensitive detector and two-dimensional position sensitive detector.

5. The apparatus as claimed in claim 1, wherein the signal processing unit coupled to the light emitting assembly, the detector, and the control unit.

6. The apparatus as claimed in claim 5, wherein the signal processing unit is selected from a group comprising of a phase sensitive detector, a low-noise amplifier, analog lock-in amplifier and a digital lock-in amplifier.

7. The apparatus as claimed in claim 1, wherein the apparatus further comprises:
a first beam directing unit coupled to the light emitting assembly via a single mode optical fiber and configured to direct the emitted beam onto the surface of the work-piece; and
a second beam directing unit configured to direct the reflected beam from the surface of the work-piece to the detector.

8. The apparatus as claimed in claim 1, wherein the apparatus further comprises a holder configured to receive the work-piece.

9. The apparatus as claimed in claim 8, wherein the control unit is further configured to impart a linear motion to the holder such that the emitted beam is caused to scan across the surface of the work-piece in a scanning direction.

10. The apparatus as claimed in claim 9, wherein:
the detector is further configured to generate a series of signals indicative of positions of the reflected beam on the detector as the emitted beam is scanned across the surface of the work-piece in the scanning direction; and
the control unit is further configured to determine the topography of the surface based on the series of signals.

11. The apparatus as claimed in claim 1, wherein the surface of the work-piece is provided with a film.

12. The apparatus as claimed in claim 11, wherein the control unit is further configured to determine stress imparted on the film formed on the surface of the work-piece based on the determined topography.

13. The apparatus as claimed in claim 12, wherein the control unit is further configured to:
obtain a blank topography of the work-piece prior to application of the film on the surface of the work-piece; and
process the blank topography and the determined topography to determine the stress imparted on the film.

14. A method for measuring surface topography comprising:
emitting an emitted beam of light, the emitted beam being emitted at a plurality of wavelengths and modulated with a modulating frequency;
directing the emitted beam onto a surface of a work-piece;
receiving a reflected beam of light that includes at least a portion of the emitted beam as reflected from the surface of the work-piece;
generating a signal indicative of a position of the reflected beam on a detector;
removing noise from the signal thus generated on the modulating frequency to obtain a processed signal; and
determining a topography of the surface based on the processed signal.

15. The method as claimed in claim 14, the method further comprising:
emitting at least three electromagnetic radiations at a wavelength selected from the plurality of wavelengths; and
combining the electromagnetic radiations into the emitted beam.

16. The method as claimed in claim 15, the method further comprising:
modulating each of electromagnetic radiations with the modulating frequency; and
combining the electromagnetic radiations thus modulated to generate the emitted beam.

17. The method as claimed in claim 14, the method further comprising determining stress imparted on a film formed on the surface of the work-piece based on the determined topography.

18. The method as claimed in claim 17, the method further comprising:
obtaining a blank topography of the work-piece prior to application of the film on the surface of the work-piece; and
processing the blank topography and the determined topography to determine the stress imparted on the film.

19. An apparatus for measuring surface topography comprising:
a first light emitting assembly configured to emit a first emitted beam of light, the first emitted beam being emitted at a plurality of wavelengths and modulated at a first modulating frequency, the first emitted beam being directed onto a surface of a work-piece;
a second light emitting assembly configured to emit a second emitted beam of light, the second emitted beam being emitted at a plurality of wavelengths and modulated at a second modulating frequency, the second emitted beam being directed onto the surface of the work-piece, the second modulating frequency being substantially different from the first modulating frequency;
a detector configured to:
receive a first reflected beam of light and a second reflected beam of light, the first reflected beam includes at least a portion of the first emitted beam as reflected from the surface of the work-piece and the second reflected beam includes at least a portion of the second emitted beam as reflected from the surface of the work-piece;
generate a first signal indicative of a position of the first reflected beam on the detector based on the first modulating frequency; and
generate a second signal indicative of a position of the second reflected beam on the detector based on the second modulating frequency; and
a control unit configured to:
determine a topography of the surface based on the first signal and the second signal.

20. The apparatus as claimed in claim 19, wherein the detector is disposed at a fixed position in a plane containing the first reflected beam and the second reflected beam and wherein the detector is operating in a linear region.

21. The apparatus as claimed in claim 20, wherein the apparatus further comprises:
  a first signal processing unit coupled to the first light emitting assembly, the detector, and the control unit, the first signal processing unit configured to:
    remove noise from the first signal based on the first modulating frequency.

22. The apparatus as claimed in claim 20, wherein the apparatus further comprises:
  a second signal processing unit coupled to the second light emitting assembly, the detector, and the control unit, the second signal processing unit configured to:
    remove noise from the second signal based on the second modulating frequency.

23. A method for measuring surface topography comprising:
  emitting a first emitted beam of light, the first emitted beam being emitted at a plurality of wavelengths and modulated at a first modulating frequency;
  emitting a second emitted beam of light, the second emitted beam being emitted at a plurality of wavelengths and modulated at a second modulating frequency, the second modulating frequency being substantially different from the first modulating frequency;
  directing the first emitted beam and the second emitted beam onto a surface of a work-piece,
  receiving a first reflected beam of light and a second reflected beam of light, the first reflected beam includes at least a portion of the first emitted beam as reflected from the surface of the work-piece and the second reflected beam includes at least a portion of the second emitted beam as reflected from the surface of the work-piece;
  generating a first signal indicative of a position of the first reflected beam on a detector based on the first modulating frequency;
  generating a second signal indicative of a position of the second reflected beam on the detector based on the second modulating frequency; and
  determining a topography of the surface based on the first signal and the second signal.

24. The method as claimed in claim 23, wherein the method further comprises:
  removing noise from the first signal based on the first modulating frequency.

25. The method as claimed in claim 23, wherein the method further comprises:
  removing noise from the second signal based on the second modulating frequency.

* * * * *